United States Patent
Oltmans

(10) Patent No.: US 8,857,552 B2
(45) Date of Patent: Oct. 14, 2014

(54) TURBOCHARGER FOR MOTORCYCLE

(76) Inventor: Jeffrey David Oltmans, North Branch, MN (US)

( * ) Notice: Subject to any disclaimer, the term of this patent is extended or adjusted under 35 U.S.C. 154(b) by 83 days.

(21) Appl. No.: 13/078,911

(22) Filed: Apr. 1, 2011

(65) Prior Publication Data

US 2012/0247857 A1 Oct. 4, 2012

(51) Int. Cl.
```
F02D 23/00    (2006.01)
B62J 31/00    (2006.01)
B62K 11/04    (2006.01)
F02B 39/14    (2006.01)
F02B 37/00    (2006.01)
F01N 13/08    (2010.01)
```

(52) U.S. Cl.
CPC ............. B62K 11/04 (2013.01); *F01N 2590/04* (2013.01); B62J 31/00 (2013.01); *F01N 2340/04* (2013.01); F02B 39/14 (2013.01); F02B 37/00 (2013.01); *Y02T 10/144* (2013.01); *F01N 13/08* (2013.01)
USPC ......................................... 180/219; 180/68.3

(58) Field of Classification Search
USPC ................................ 180/219, 68.3
See application file for complete search history.

(56) References Cited

U.S. PATENT DOCUMENTS

| | | | | |
|---|---|---|---|---|
| 4,396,085 A | * | 8/1983 | Inoue et al. | 180/219 |
| 4,445,336 A | * | 5/1984 | Inoue | 60/605.1 |
| 4,469,189 A | * | 9/1984 | Minami et al. | 180/219 |
| 4,475,617 A | * | 10/1984 | Minami et al. | 180/219 |
| 4,495,773 A | * | 1/1985 | Inoue et al. | 60/605.1 |
| 4,735,178 A | * | 4/1988 | Inoue et al. | 180/219 |
| 4,760,703 A | * | 8/1988 | Minami et al. | 60/605.1 |
| 4,798,523 A | * | 1/1989 | Glaser et al. | 417/407 |
| 4,841,926 A | * | 6/1989 | Hain et al. | 123/146.5 A |
| 6,055,959 A | * | 5/2000 | Taue | 123/317 |
| 6,848,528 B2 | * | 2/2005 | Pichler et al. | 180/190 |
| 6,962,225 B2 | * | 11/2005 | Conte | 180/68.3 |
| 7,051,824 B1 | * | 5/2006 | Jones et al. | 180/68.3 |
| 7,469,689 B1 | * | 12/2008 | Jones et al. | 123/559.1 |
| 2007/0151788 A1 | * | 7/2007 | Runolfson | 180/219 |
| 2012/0180482 A1 | * | 7/2012 | Kapich | 60/608 |

* cited by examiner

*Primary Examiner* — Joseph M Rocca
*Assistant Examiner* — Michael Stabley

(57) ABSTRACT

A motorcycle with V-type engine employs a turbocharger and necessary components arranged in an advantageous layout such that it does not interfere with the rider's legs or feet. The turbocharger system includes a turbocharger positioned fore of the front cylinder, aft of the front wheel, and below the front exhaust port. The rear cylinder exhaust pipe routes on a horizontal plane adjacent to the lower area of the cylinders, as to not interfere with the rider's legs or feet. The turbocharger lubrication system includes a vented oil holding tank fastened to the turbocharger's oil outlet port, in conjunction with an electric pump to transfer the oil from the holding tank back to the engine crankcase for the reason that the level of the turbocharger oil outlet is lower than the level of the engine's oil sump level. The intake plenum is secured to the throttle body assembly by fasteners entering through the bottom of said throttle body that screw into tapped holes of the lower section of the intake plenum, such that the structure does not interfere or impede the incoming airflow.

11 Claims, 6 Drawing Sheets

TURBOCHARGER FOR MOTORCYCLE

BACKGROUND OF THE INVENTION

1. Field of the Invention

This invention relates to a motorcycle with a turbocharger and associated components and more particularly to the advantageous arrangement of said components in the confined spaces of a motorcycle with a V type engine.

2. Discussion of Prior Art

It is known in the art, that increasing the airflow to an internal combustion engine will supply an increase in power output. Of the means to achieve this, using a turbo supercharger, or turbocharger as commonly referred to, is an effective technique to attain this increase in airflow. A turbocharger is a device which uses the high velocity, rapidly expanding hot exhaust gases exiting an internal combustion engine, generating supercharged air into the engine induction. A turbocharger consists of a turbine and compressor, each of which has a wheel on a common shaft. As the exhaust gases exit an internal combustion engine, said exhaust gases then enter the turbine side of the turbocharger. This energy is used to rotate the turbine wheel, which in turn, rotates the compressor wheel. The compressor side of the turbocharger takes in ambient air and compresses it while sending it to the intake side of the engine, thus achieving a higher density air charge per intake revolution of an internal combustion engine. This higher density air, combined with additional fuel to achieve the correct air to fuel ratio, enables the engine to produce more power than a naturally aspirated engine.

One of the critical issues with applying a turbocharger to a motorcycle with a V-type (V-twin as commonly found in cruiser type motorcycles, although multiples of 2, e.g. 4, 6, 8 are possible) engine, is the lack of space surrounding the engine.

The present invention applies to motorcycles with V-type engines with the axis of the crankshaft in the lateral vehicle direction. This lateral crankshaft configuration is commonly found in Harley Davidson®, Victory®, and numerous other cruiser type motorcycles. Earlier patents have been applied to motorcycles with V-type engines with the axis of the crankshaft in the longitudinal direction. Two such patents are U.S. Pat. No. 4,396,085 to Inoue, and U.S. Pat. No. 4,495,773 to Inoue, et al. discloses a configuration with a V-twin engine with crankshaft axis in the longitudinal direction, and the turbocharger positioned laterally of the engine (forward vehicle direction), centered between the V arranged cylinders. Such a configuration works well with the V-twin engine oriented in above said manner, but would not work well with a V-type engine with crankshaft axis in the lateral direction for the reason that the turbocharger would be positioned to the lateral side of the engine, in the area of the riders legs, posing hazard to the rider as a result of the immense heat produced by the turbocharger in excess of 1600° F.

U.S. Pat. No. US 20070151788A1 to Runolfson, et al. discloses a motorcycle having a turbocharger positioned above the rear wheel; below the rear fender/seat. This application is intended for use in the sportbike motorcycle category, in which there is sufficient space for said configuration. Unfortunately, there is not sufficient space for said configuration in a cruiser type motorcycle, for the reason that the layout differs in that the rear fender commonly sits much closer to the rear wheel, as opposed to a sportbike configuration.

U.S. Pat. No. 4,469,189 to Minami, et al. discloses a motorcycle having a turbocharger positioned behind the engine, between the engine and rear wheel. In this configuration, the exhaust exits the engine towards the front of the motorcycle. The exhaust pipes route down the front of the engine, then below the engine towards the rear of the motorcycle, then upward behind the engine to the turbocharger, located between the engine and the rear wheel. This configuration would not work with cruiser type motorcycles with a V-type engine because of the confines in the above specified area of the motorcycle.

SUMMARY OF THE INVENTION

The present invention provides an improved turbocharged motorcycle configuration that does not suffer from the problems and limitations of the prior art detailed above. The turbocharged motorcycle invention described here has several key features that allow it to work well within the confines of a motorcycle with V-type engine in the common cruiser configuration with lateral axis crankshaft and V-type cylinders symmetric in the fore-aft direction about a vertical plane. This invention provides an arrangement which allows the rider to operate the vehicle without any negative affects such as components intruding in the areas of the rider's legs and feet. This invention also addresses the challenges that occur due to the location of the turbocharger and associated components.

All aspects of the present invention concern a turbocharged motorcycle broadly including a frame assembly, a front wheel suspended from the fore section of the frame, a rear wheel suspended from the aft section of the frame, a V-type engine including a crankshaft with the centerline axis in the lateral direction of said motorcycle generally positioned between the wheels.

The first aspect of the present invention involves the position of the turbocharger relative to the engine and front wheel. In accordance with the invention, the turbocharger is positioned between the engine and front wheel, spaced longitudinally forward of the engine, longitudinally rearward of the front wheel, vertically below the front exhaust port, and vertically above the bottom plane of the engine crankcase.

The second aspect of the present invention involves the routing of the exhaust pipes from the engine's cylinders to the turbocharger. The rear exhaust pipe exits the rear cylinder exhaust port, facing the rear of the motorcycle, then bends 180° towards the front of the motorcycle and follows a horizontal plane along the bottom lateral side (illustrated on left side, although could be configured to run on the right side) of said V-type engine cylinders. From there it utilizes a slip fit connection for assembly, after where it passes around the front cylinder and merges into a two-into-one collector with the front cylinder exhaust pipe above the turbocharger, and below the front cylinder exhaust port. The front exhaust pipe exits the front cylinder exhaust port facing the fore direction, then immediately bends downward towards aforementioned turbocharger, where it merges into a two-into-one collector with the rear exhaust pipe just above the turbocharger. The exhaust pipe two-into-one then enters the turbocharger turbine inlet positioned at the top of the turbocharger.

The third and fourth aspects of the present invention pertain to the turbocharger oil lubrication return system. This system utilizes a vented oil holding tank attached to the oil outlet port of the turbocharger in conjunction with an electric oil return pump.

The fifth aspect of the present invention pertains to the manner in which the intake plenum is fastened to the throttle body assembly in the tight confines of this area of the motorcycle. This invention uses fasteners that route from the bottom of the throttle body, through the throttle body, and then thread into the bottom face of the intake plenum.

BRIEF DESCRIPTION OF DRAWINGS

Preferred embodiments of the invention are described in detail below with reference to the attached drawing figures, wherein.

DETAILED DESCRIPTION

The invention will be described in detail in reference to the attached drawings.

Figure 1:
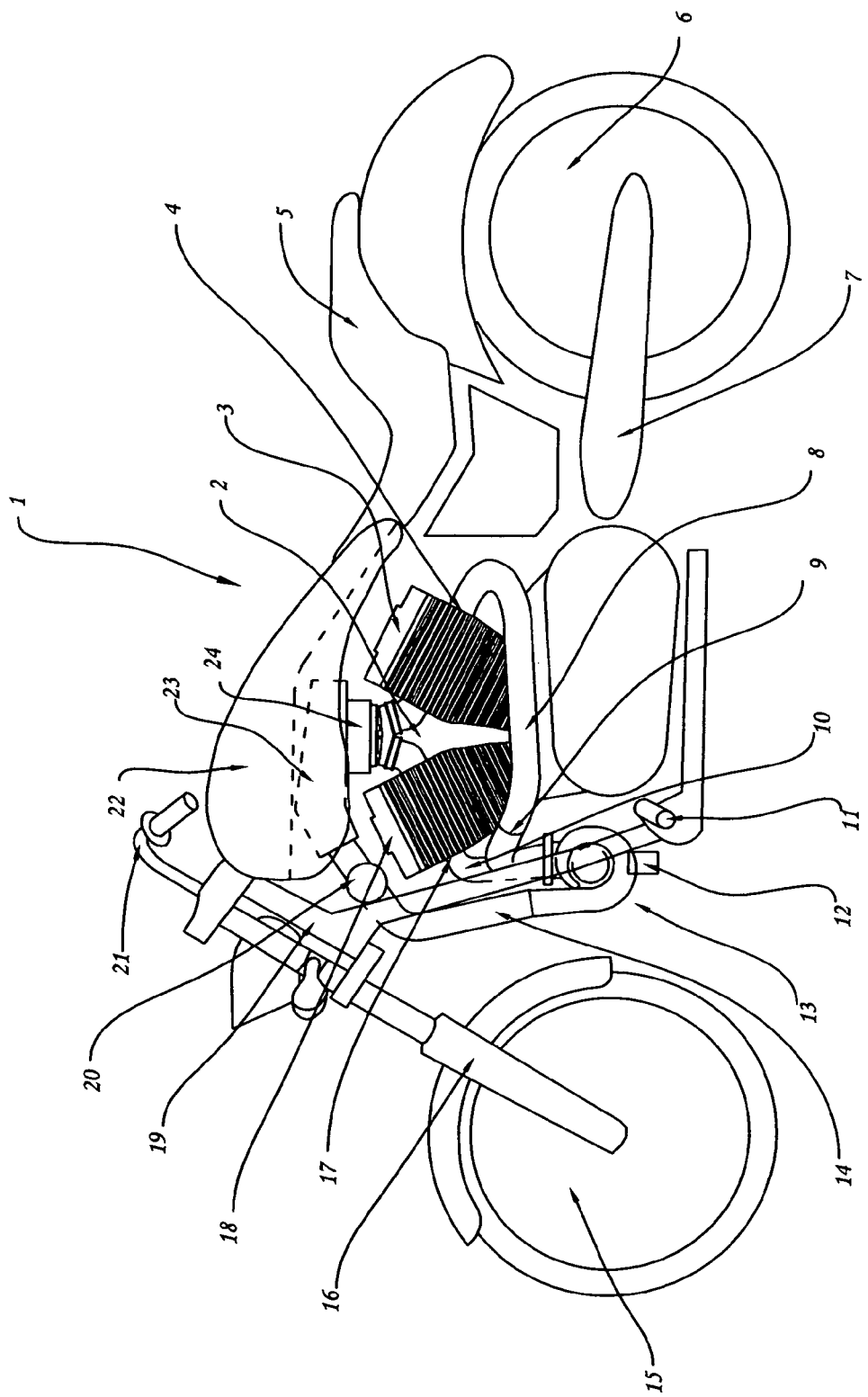
FIG. 1 is a left side elevation view of a turbocharged motorcycle constructed in a manner with which the present invention has been described.

The present invention is broadly shown in FIG. 1 in which the turbocharged motorcycle is generally designated 1. This motorcycle is conventional in aspects known in the art, and could be any OEM motorcycle with V-type engine, and in this regard will only be discussed briefly. The turbocharged motorcycle 1 has an engine 2 supported by a frame 19 between the front and rear wheels 15 and 6, which are aligned and longitudinally spaced. The front wheel 15 is suspended from the frame 19 by a fork suspension assembly 16. The rear wheel 6 is attached to the frame 19 by a swingarm assembly 7. The engine 2 is a V-type, in this case a V-twin having two cylinders in a V arrangement with the axis of the crankshaft in the lateral direction as shown. The fuel tank 22 is shown positioned above the engine 2. The rider's seat 5 is positioned aft of the fuel tank 22. The rider's footpegs 11 are shown positioned at the lower aft section of the frame 19, but could be located in other locations about the frame 19, below the seat 5. Although the foot support surface is shown as footpegs 11 as known in the art, could also be a footboard with a larger supporting surface area. The handlebars 21 are located above the frame 19, typically above the fore section of the fuel tank 22.

First, a general description of the workings of the turbocharger system will be explained, followed by key aspects of the invention described in more detail. Looking at FIG. 1, the general layout of the turbocharger system is shown. As the internal combustion engine 2 is running, high velocity, hot expanding gases exit the front and rear cylinder's exhaust ports 17 and 4. These exhaust gases travel through the front exhaust pipe 10 and rear exhaust pipe 8, and then combine at a two-into-one collector 25. After the said collector 25, the exhaust gases travel into the inlet of the turbocharger turbine 41, and by nature of the hot expanding gases with high velocity, the gases rotate the turbine wheel with rotational speeds upwards of 150,000 rpm. The expelled exhaust gases then exit the turbocharger 13 through the discharge exhaust pipe 29.

The shaft of the turbine 41 is directly connected to the compressor 31 side wheel, which draws in ambient air through the filter 26, then through the compressor inlet 27. The compressor 31 then transfers the compressed, high velocity ambient air through the intake pipe 14, then into the intake plenum 23. The intake pipe 14 is held to the compressor 31 outlet and intake plenum 23 inlet by clamped silicone couplers 28. The intake pipe 14 contains what is known in the art as a Blow-Off-Valve 20, which allows excessive induction pressure to exit the system. This can occur when the operator closes the throttle body 24 blades while the turbocharger wheels are still rotating at a high rotational velocity. The compressed air then flows through the intake plenum 23, and into the throttle body 24 (or carburetor(s) for non-EFI applications), where the flow rate is typically controlled by butterfly valves. The air then passes through the intake boot 42 and enters the cylinder intake ports, then passes through the intake valves of the cylinder head, and finally ends up in the combustion chamber as a more dense, higher power producing combustion than compared to a naturally aspirated engine.

Figure 2:
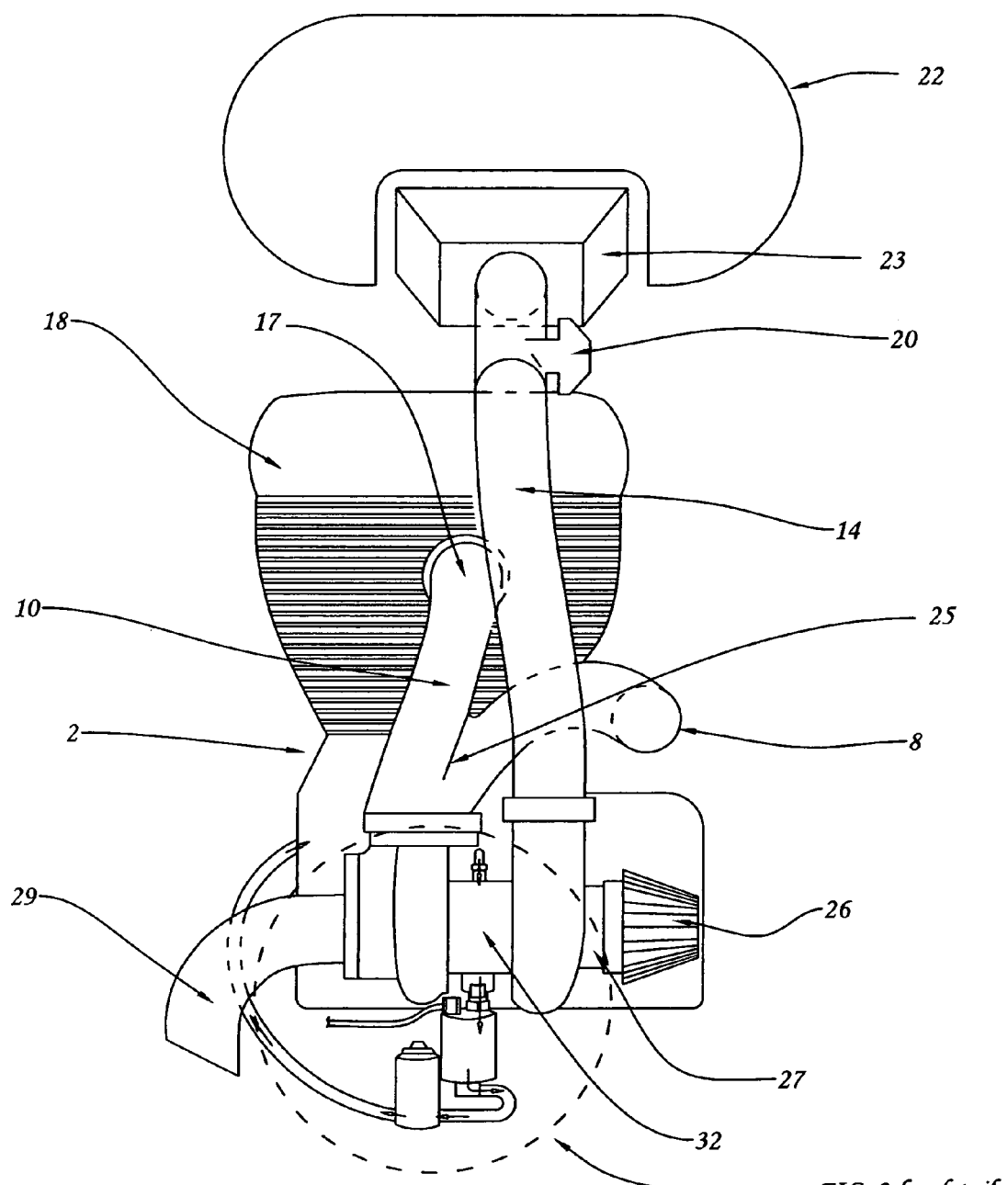
FIG. 2 is a front view of the turbocharged motorcycle illustrated in FIG. 1, illustrating the turbocharger assembly and exhaust pipes merging into the turbocharger turbine inlet.
Figure 3:
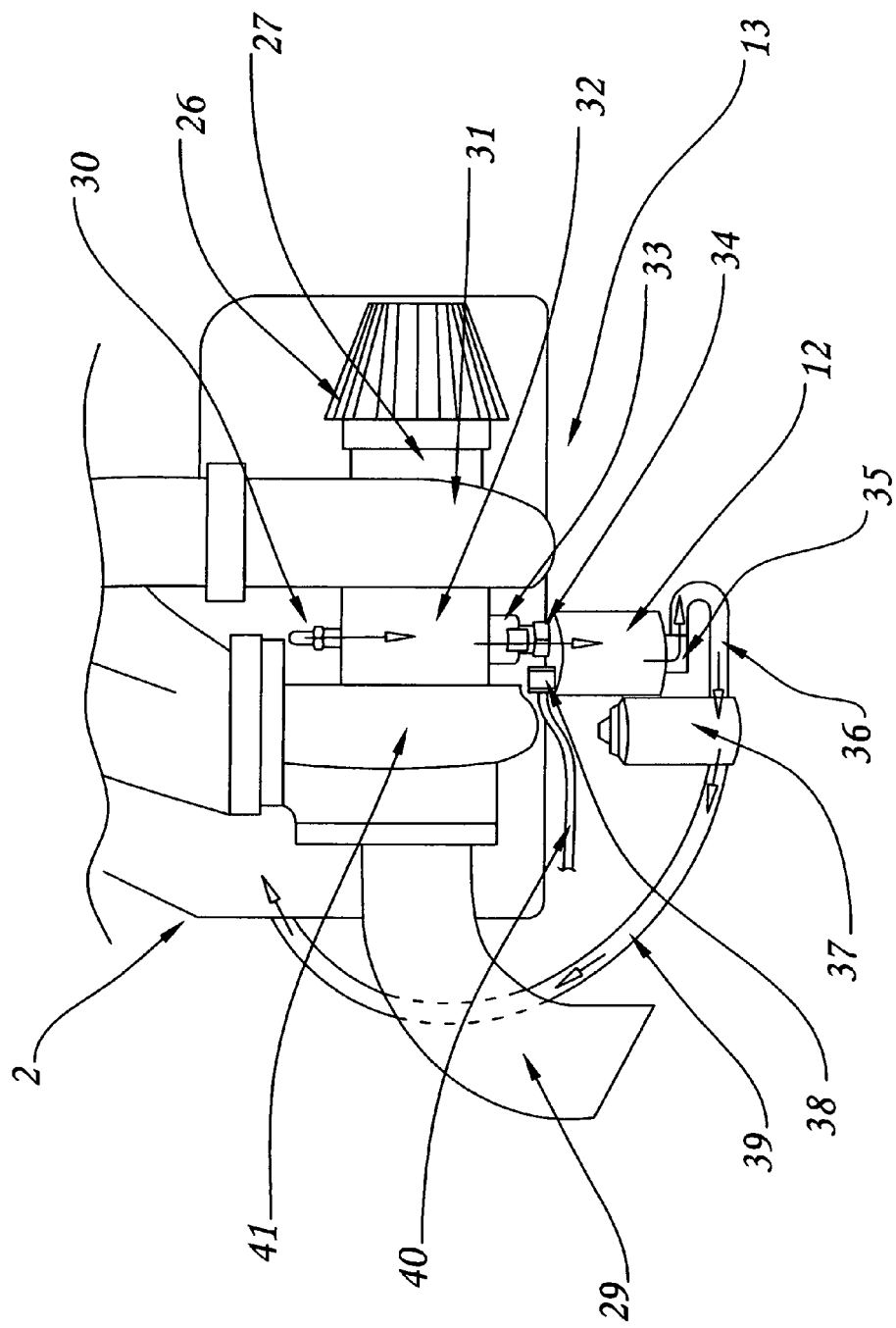
FIG. 3 is a front view of the turbocharger assembly illustrated in FIG. 2, with specific focus on the oil holding tank and return pump.

FIGS. 1, 2 and 3 illustrate details of the first aspect of the invention, which is the location and orientation of the turbocharger 13. The turbocharger 13 is positioned fore of a vertical plane passing through the front cylinder 18 of the V-type engine 2, it is also position below the front cylinder exhaust port 17, and aft of the front wheel 15. The turbocharger 13 is oriented such that the compressor 31 outlet and turbine 41 inlet are oriented upward. This configuration allows the incoming exhaust gases and the outgoing compressed air to have the least restrictive flow in the tight confines of the motorcycle 1, while not intruding on critical spaces of the rider or other components of the motorcycle 1.

Figure 6:
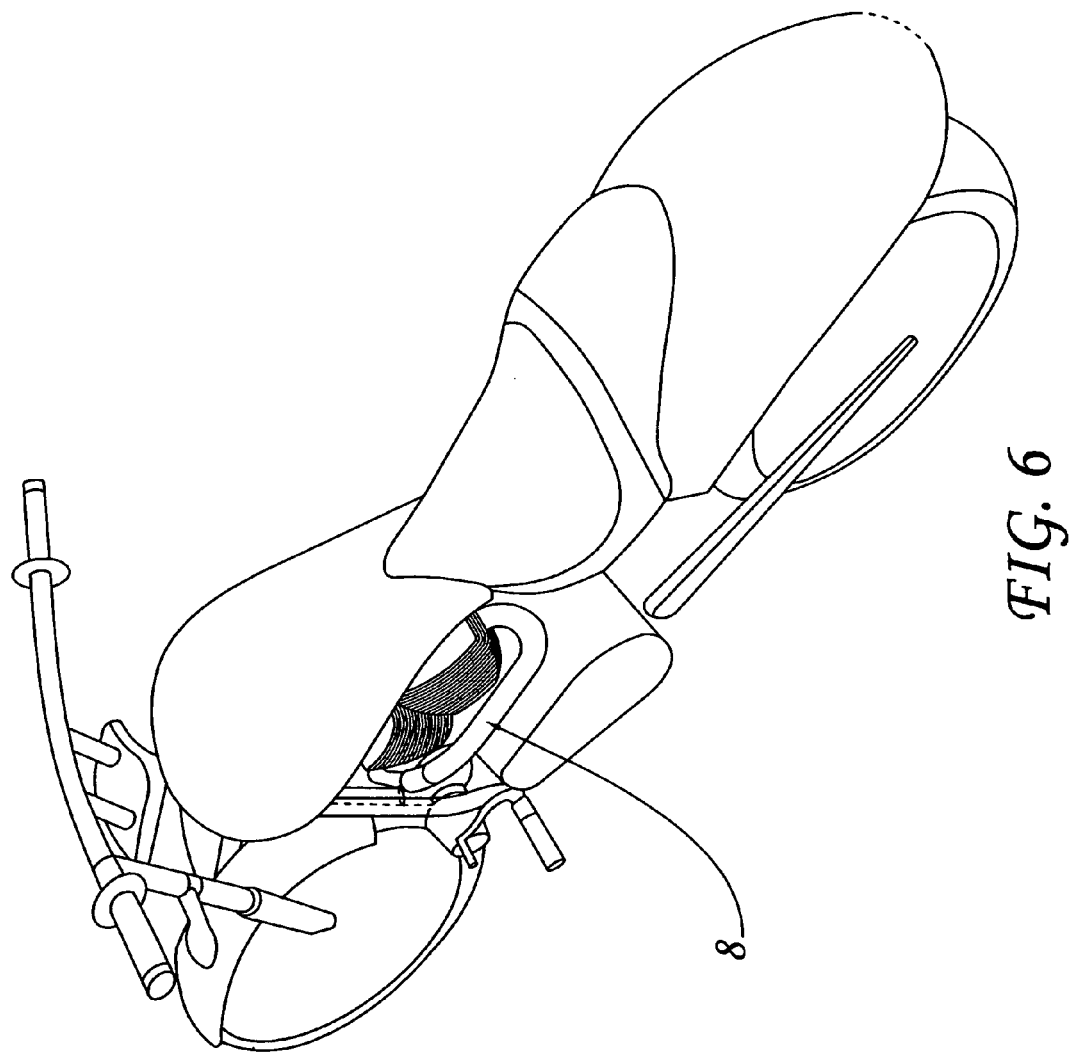
FIG. 6 is a partial rear perspective view of the turbocharged motorcycle illustrated in FIG. 1 showing that the turbocharger components are positioned inboard of the area of the rider's legs and feet.

FIGS. 1, 2 and 6 illustrate details of the second aspect of this invention, which is the routing and location of the exhaust piping from the front and rear engine cylinders 18 and 3, to the turbocharger turbine 41, such that none of the components interfere with the rider's legs and feet, while keeping the fluid flow through the exhaust pipes as unrestricted as possible. As shown in FIG. 1, the rear exhaust pipe 8 exits the rear cylinder exhaust port 4, facing the rear of the motorcycle 1, then bends 180° towards the front of the motorcycle 1 and follows a horizontal plane along the bottom lateral (either left or right; left shown in drawings) side of said V-type engine cylinders 18 and 3, it then ends at a slip fit joint 9, used for assembly and disassembly. Although a slip fit connection is shown, other connection types such as V-band, or flanges could be utilized. The exhaust pipe then passes around the front cylinder 18 and merges into a two-into-one collector 25 with the front cylinder exhaust pipe 10 above the turbocharger 13, and below the front cylinder exhaust port 17. As shown in FIG. 2, the front exhaust pipe 10 exits the front cylinder exhaust port 17 facing the fore direction, then immediately bends downward towards aforementioned turbocharger 13, where it merges into the two-into-one collector 25 with the rear exhaust pipe 8 just above the turbocharger 13. The exhaust pipe two-into-one collector 25 then enters the turbocharger turbine 41 inlet positioned at the top of the turbocharger 13.

The third and fourth aspects of this invention address the challenge of the turbocharger oil lubrication system. A typical turbocharged automobile will position the turbocharger at a height in which the turbocharger oil outlet is higher than the engine oil sump level. This allows the flow of oil such that the high pressure oil supply exits the engine, then routes to the turbocharger oil inlet port, then passes through the turbocharger bearings for lubrication, and finally exits the turbocharger oil outlet and returns to the engine oil sump pan. A challenge in placing a turbocharger in the location specified in the present invention is the fact that the turbo oil outlet port is typically lower than the engine oil sump level. This creates a challenge, in that without an external pump, the oil from the turbo would be restricted from returning to the engine, causing undesirable effects with oil bypassing the turbo oil seals, causing smoke, and premature failure of the turbocharger. As FIG. 3 shows, this invention resolves the aforementioned challenge using two main components, the first is an oil holding tank 12 which is fastened to the bottom of the turbocharger 13 at the oil outlet port 33, the second component is an electric oil return pump 37. The turbocharger lubrication oil first enters the turbocharger at the oil inlet port 30. After passing through the turbocharger bearing assembly 32, the oil exits the turbocharger at the turbocharger oil outlet port 33, then enters the oil holding tank 12. The oil holding tank 12 has an oil inlet port 34 at the top, an oil outlet port 35 at the bottom, and a vent port 38 at the top. As the turbocharger lubrication oil exits the oil holding tank outlet port 35, it then travels by hose 36 from the oil holding tank 12 to an electric pump 37 which transfers the lubrication oil, by hose 39, back to the engine crankcase oil sump. The key to this aspect of the invention is the vented oil holding tank 12, which allows the electric oil return pump 37 to operate without having varying pressures induced at its inlet. The vent port 38 on the oil holding tank 12 connects to a hose 40, which routes any vapors back to the intake plenum 23 of the engine. The hose 40 has a check valve, which allows flow in the direction from the turbocharger oil holding tank 12 to the engine 2, but not from the engine 2 to the turbocharger oil holding tank 12. This prevents supercharged air from pressurizing the oil holding tank 12.

Figure 4:
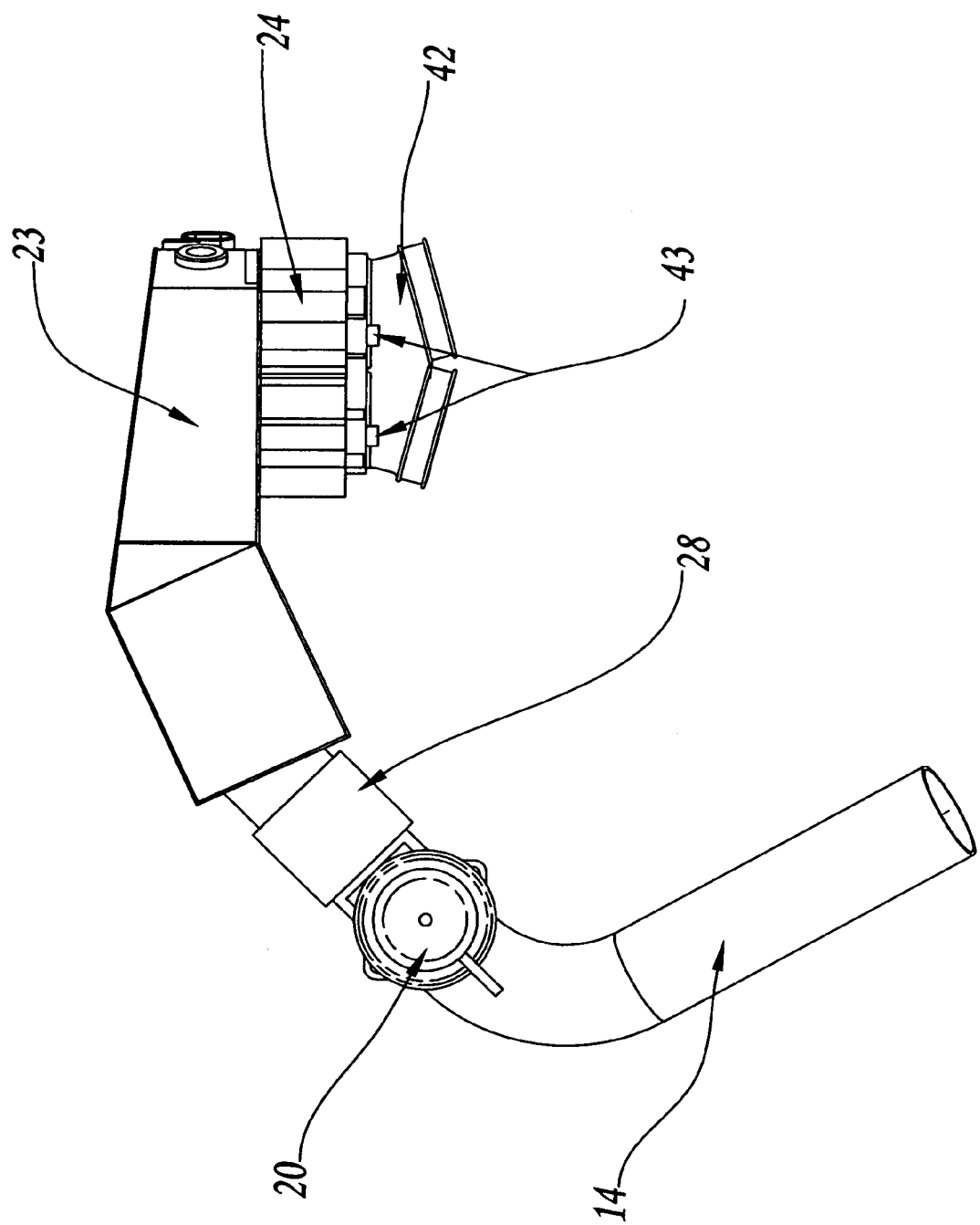
FIG. 4 is a left side elevation view of the intake assembly of the turbocharged motorcycle illustrated in FIG. 1.
Figure 5:
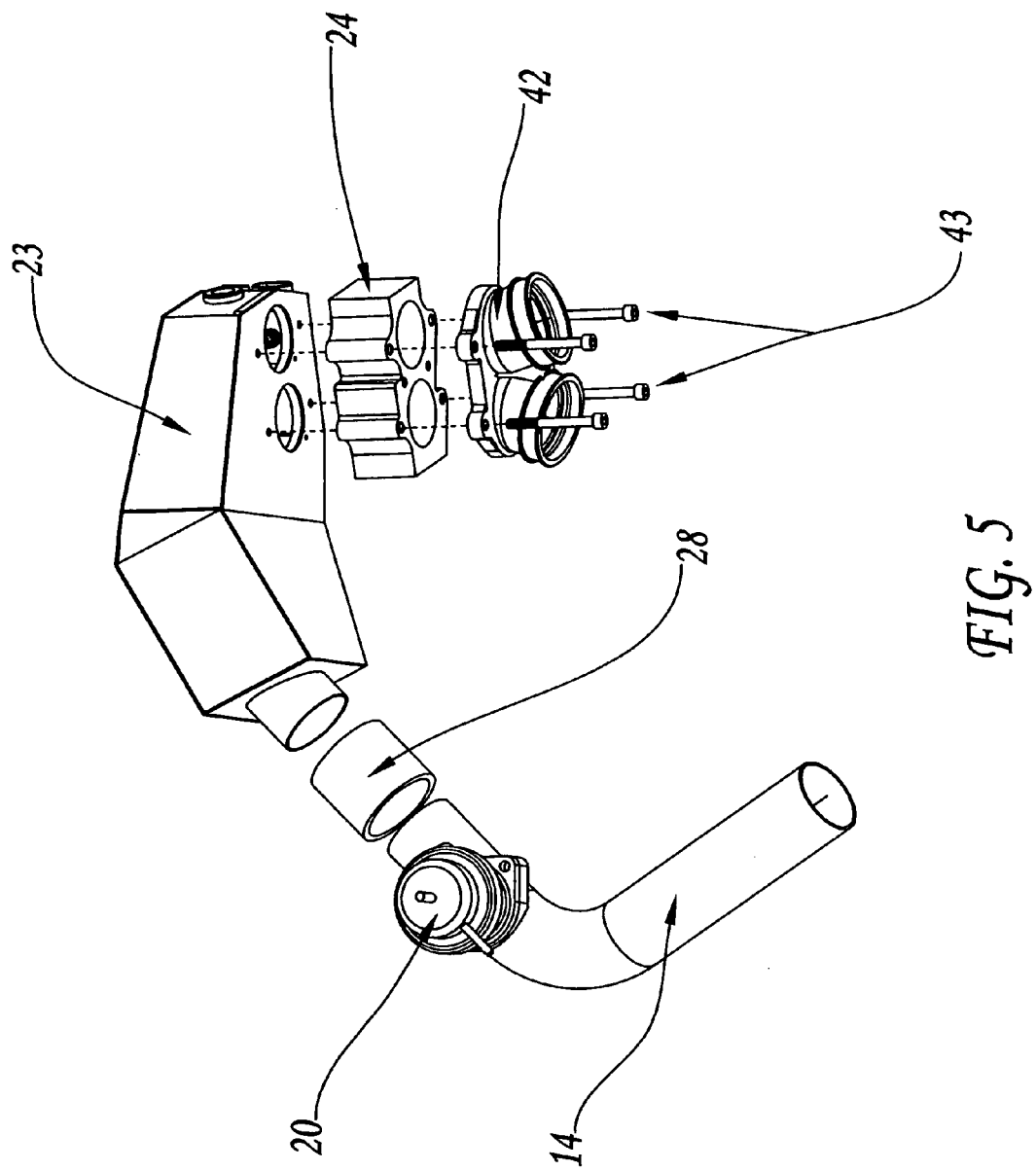
FIG. 5 is an isometric view of the exploded (disassembled) intake assembly of the turbocharged motorcycle illustrated in FIG. 1.

The fifth aspect of this invention describes the solution to the challenge of securing a positive pressure capable intake plenum 23 to the throttle body assembly 24 in the tight confines of the motorcycle 1 between the engine 2 and the fuel tank 22. Typically a motorcycle airbox (intake plenum 23 for turbocharged configuration) is secured to the throttle body assembly 24 by inserting fasteners from the outside top of the said airbox, through the airbox, and into the throttle body threaded holes. The disadvantage to this system in relation to a turbocharged configuration is: 1) the fasteners and accompanying structure reduces from the overall volume of the intake plenum 23, which is undesirable in the system, and 2) it creates a complicated manufacturing process and sometimes poor clamp load between the intake plenum 23 and throttle body 24. The present invention solves the aforementioned problems by doing the following as shown in FIGS. 4 and 5: An intake pipe 14 collects the supercharged air from the compressor side 31 of the turbocharger 13, and routes it upward, above the front cylinder 18, then rearward below the fuel tank 22, and above engine 2 where it enters an intake plenum 23 between the V-type cylinders. The intake plenum 23 is secured to the throttle body 24 by using fasteners 43 that run from the bottom of the throttle body boot 42 through the throttle body 24, then into the threaded holes in the intake plenum 23.

Whereas the invention has been described using several embodiments, it will be obvious to those with skill in the art that changes and modifications can be made therein without departing from the spirit and scope of the invention.

I claim:

1. A motorcycle having a frame assembly; a front wheel suspended from a fore section of the frame, a rear wheel suspended from the aft section of the frame, an internal combustion engine with cylinders in a V-type arrangement with a front cylinder and a rear cylinder including a crankshaft with the centerline axis in the lateral direction of said motorcycle, in which the engine is generally positioned between the wheels, said engine having at least one induction port and at least one exhaust port, a turbocharger system comprising: a turbocharger positioned fore of the front cylinder, aft of the front wheel, and below the front cylinder exhaust port; said turbocharger having a compressor with ambient air inlet and compressed air outlet, said turbocharger also having a turbine stage with intake and exhaust ports; an induction system which couples said compressed air outlet to said at least one engine induction port; an exhaust pipe configuration which couples said at least one engine exhaust port to said turbocharger turbine intake port; wherein said exhaust pipes are routed such that the rear exhaust pipe exits the rear cylinder exhaust port, then bends laterally and towards the front of the motorcycle and follows a horizontal plane along either the lateral left side of said V-type engine cylinders or the lateral right side of said V-type engine cylinders; then merges into a two-into-one collector before entering the turbocharger.

2. The motorcycle of claim 1, wherein the two-into-one collector is positioned longitudinally forward of the engine, with the front cylinder exhaust pipe above the turbocharger, and below the front cylinder exhaust port; the front exhaust pipe exits the front cylinder exhaust port facing the fore direction; then immediately bends downward towards aforementioned turbocharger, where it merges into the two-into-one collector with the rear exhaust pipe just above the turbocharger.

3. The motorcycle of claim 1, wherein an oil holding tank is fastened to the turbocharger oil drain outlet; said tank has an inlet port at the top of the tank, an outlet port at the bottom of the tank, and a vent port at the top of the tank.

4. The motorcycle of claim 1, wherein an oil holding tank is fastened to the turbocharger oil drain outlet; said tank has an inlet port at the top of the tank, an outlet port at the bottom of the tank, and a vent port at the side of the tank.

5. The motorcycle of claim 1, wherein an oil holding tank is fastened to the turbocharger oil drain outlet; said tank has an inlet port at the top of the tank, an outlet port at the side of the tank, and a vent port at the top of the tank.

6. The motorcycle of claim 1, wherein an oil holding tank is fastened to the turbocharger oil drain outlet; said tank has an inlet port at the top of the tank, an outlet port at the bottom of the tank.

7. The motorcycle of claim 1, wherein an oil holding tank is remotely mounted below the turbocharger, on the chassis, employing a hose to transfer oil from the turbocharger to the oil holding tank.

8. The motorcycle of claim 1, wherein an oil holding tank is fastened to the turbocharger oil drain outlet, an electric pump is used to transfer the lubrication oil from the oil holding tank outlet, to the engine oil sump.

9. The motorcycle of claim 1, wherein an air induction system employs a plenum which occupies the space between the engine and fuel tank.

10. The motorcycle of claim 1, wherein an air induction system employs a plenum which occupies the space between the engine and fuel tank, such that the plenum inlet faces the fore direction above the front cylinder.

11. The motorcycle of claim 1, wherein an air induction system employs a plenum which occupies the space between the engine and fuel tank, such that the plenum inlet faces the fore direction above the front cylinder; said plenum is fastened to the throttle body assembly such that the fasteners enter through the bottom of the throttle body assembly, through throttle body thru-holes, and then thread into the bottom of the intake plenum, clamping the intake plenum securely to the throttle body assembly.

* * * * *